Figure 1:
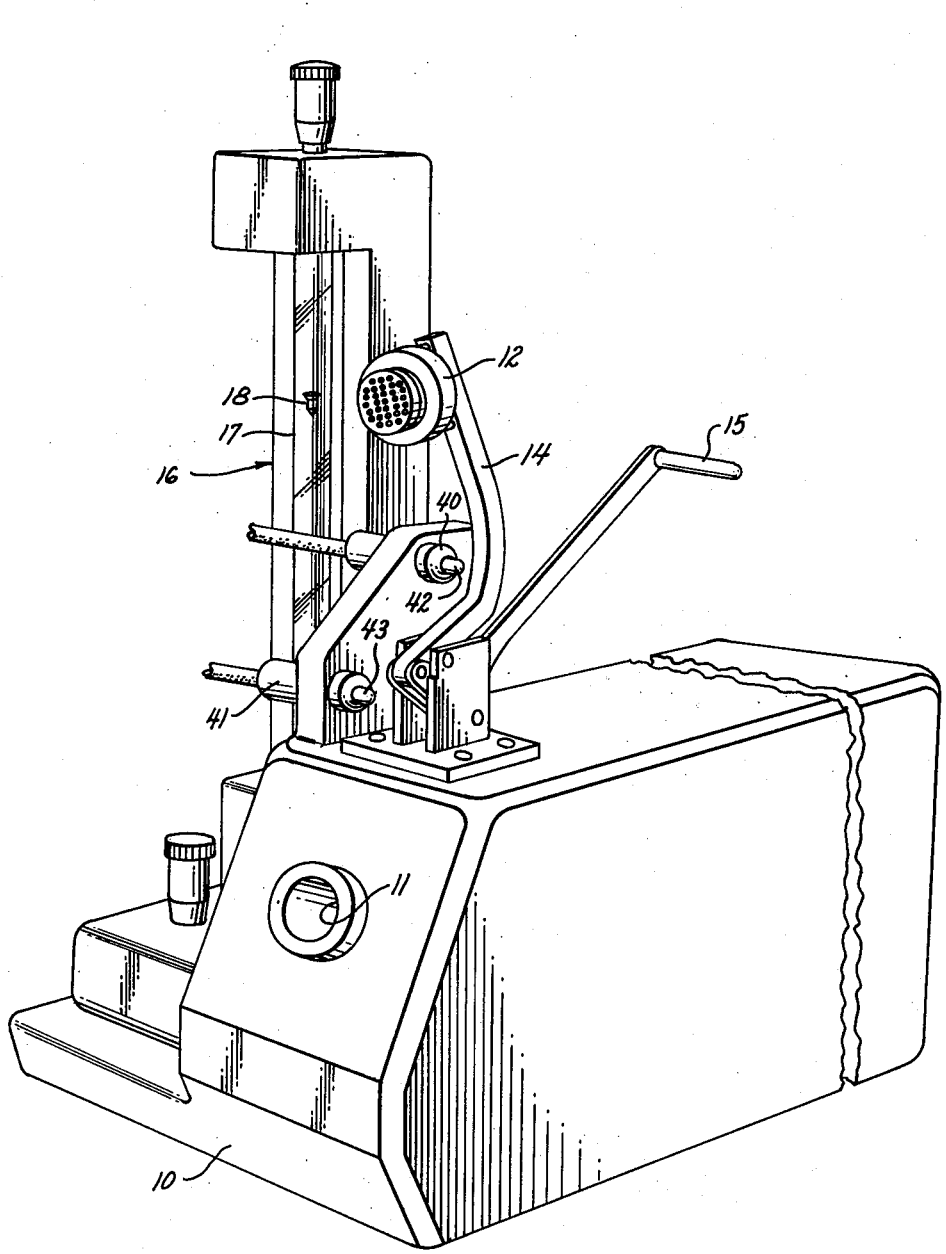

Nov. 26, 1963  N. EMMONS III  3,111,836
GAGING APPARATUS
Filed May 3, 1960  2 Sheets-Sheet 1

INVENTOR
Nelson Emmons III
BY
Ernest J. Hix
ATTORNEY

Nov. 26, 1963  N. EMMONS III  3,111,836
GAGING APPARATUS
Filed May 3, 1960  2 Sheets-Sheet 2

INVENTOR
Nelson Emmons III
BY Ernest J. Hix
ATTORNEY

United States Patent Office 3,111,836
Patented Nov. 26, 1963

3,111,836
GAGING APPARATUS
Nelson Emmons III, Dayton, Ohio, assignor to The Sheffield Corporation, Dayton, Ohio, a corporation of Delaware
Filed May 3, 1960, Ser. No. 26,517
2 Claims. (Cl. 73—38)

This invention relates to a gaging apparatus and more particularly to a pneumatic apparatus for measuring fibre characteristics.

One of the established methods for measuring the fineness of fibrous materials such as cotton, wool and the like is by measuring the air flow from a controlled source through a predetermined mass of the fibre compressed to a predetermined volume in a measuring chamber of established configuration. Measurements of large numbers of fibre samples are often made in a continuous production type operation, especially in large concerns handling quantities of these materials which require testing.

In manually operated units provided for making this measurement both the fibre sample and a fibre compressing plunger are inserted manually into the same end of the receiving chamber, following which air flows through the chamber from a flow measuring instrument which acts as a comparator. Known automatic apparatuses are of a basically similar construction, including a mechanically actuated external plunger and controls to provide an automatic sequential operation. In these known constructions the plunger is inserted by power into the same chamber opening through which the fibre is inserted.

Manually operated units have the obvious deficiencies of slowness and operator fatigue in high production operations, giving inefficient operation and inaccurate measuring results. Known automatic devices are either dangerous to the operator's hands because of the mechanically driven external compression plunger, or involve complex safety arrangements to avoid this danger. Also these automatic units require complex and expensive control arrangements to provide the desired automatic sequence of operation.

It is accordingly an object of this invention to provide an apparatus for rapid repetitive measurements of fibre fineness, with inherent safety to the operator, and in an apparatus of basic simplicity, economy and reliability.

It is a further object to provide an apparatus for measurement of fibre characteristics in which the fibre can be conveniently applied to the receiving chamber and the retaining cover closed without exerting any substantial compressive effect on the fibrous mass.

It is a further object to provide such an apparatus wherein a cover is moved by the operator to and from closing relation with one end of the fibre receiving chamber, a fibre compressing plunger being operable within the chamber remote from the operator in response to closing movement of said cover, whereby an inherently safe operation is provided while maintaining high efficiency in measurement.

It is a further object to provide such an apparatus wherein the fibre compressing plunger in its movements automatically controls flow of gaging air through the chamber by direct cooperation with an air admitting port in the chamber wall, admitting air upon forward movement and maintaining fibre ejecting flow until it is retracted.

Figure 2:
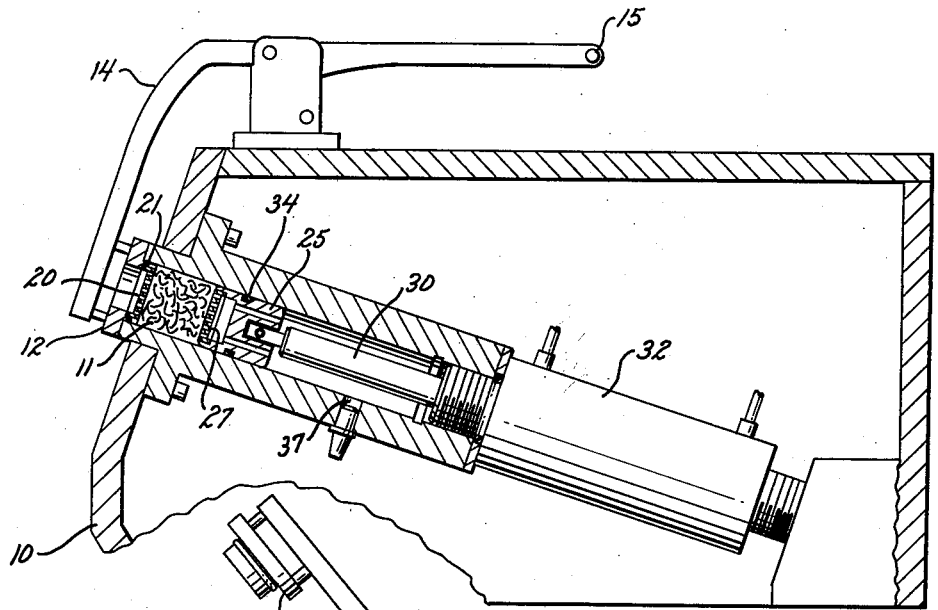
Figure 3:
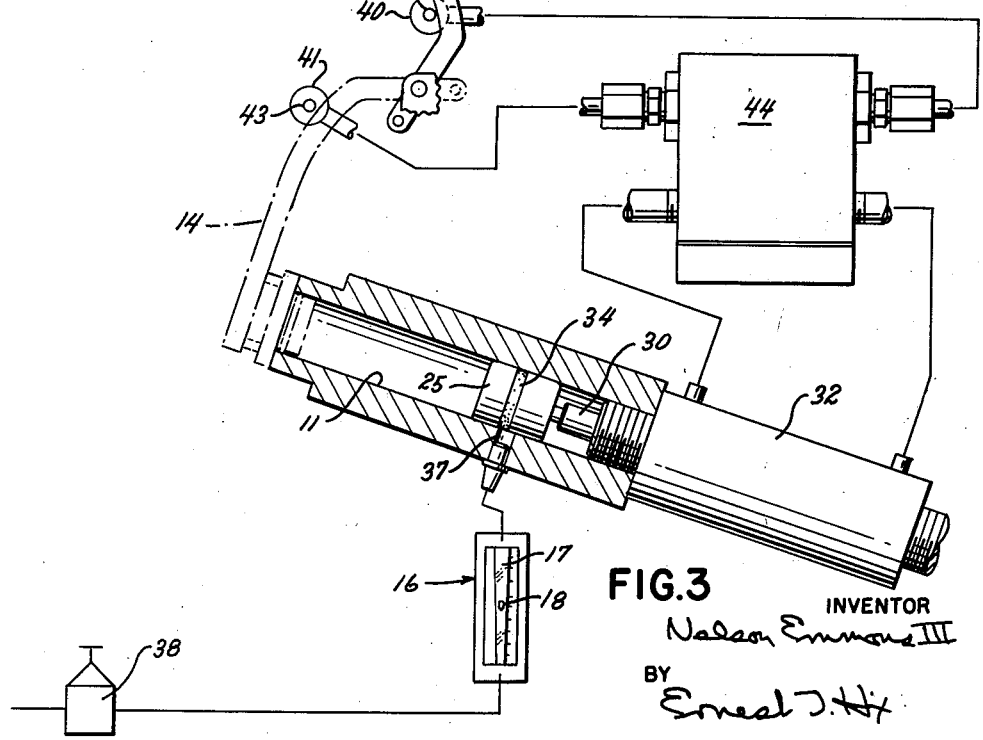

Other objects and advantages of the invention will be apparent from the following description, the appended claims, and the accompanying drawings, in which, FIGURE 1 illustrates in perspective an exemplary apparatus embodying the present invention, FIGURE 2 is a vertical central section of a portion of the apparatus of FIGURE 1 illustrating the fibre receiving chamber and its associated structure, and FIGURE 3 is a diagrammatic illustration of the pneumatic actuating and measuring circuitry involved in the operation of the apparatus.

In the illustrated embodiment of the present invention a cylindrical fibre receiving chamber has a cover at one end thereof manually moved to and from the chamber end. A fibre compressing plunger within the chamber is automatically actuated along the chamber axis from a rearward protected position remote from the cover forward toward the cover to compress the inserted fibrous mass therebetween. Operations of the compressing plunger are automatically responsive to movements of the chamber cover.

Both ends of the chamber have passage means of predetermined area therethrough so that air can pass through the contained mass. The initial forward movement of the compressing plunger in response to closing of the cover uncovers a port in the chamber wall to admit air flow from a suitable source and flow measuring instrument, into and through the compressed fibrous mass. Responses of the flow measuring instrument indicate the fibre fineness in a known manner. Opening of the cover allows ejection of the mass from the chamber by the continuing air flow which is terminated when the plunger reaches its rearward position and covers the admitting port.

Referring more particularly to the drawings, FIGURE 1 illustrates an exemplary apparatus embodying the present invention and including a base 10 which supports a fibre receiving chamber 11 supported at an angle to the horizontal for easy insertion of the fibrous mass to be gaged. A chamber cover 12 is carried on lever 14 actuated to move cover 12 to and from closed relation with one end of chamber 11 through a suitable toggle linkage by handle 15. Flow through the compressed mass of fibres within chamber 11 is indicated by a flow measuring instrument 16 as will be later described. Instrument 16 includes a transparent internally tapered flow tube 17 having an indicating float 18 positioned vertically therealong in accordance with the velocity of flow through the compressed fibrous mass.

As seen in FIGURE 2, cover 12 is closed in sealed relation with the walls of chamber 11. It includes perforated openings therethrough as indicated at 20 of a predetermined total area. An O-ring 21 prevents escape of air from chamber 11 around cover 12 to insure that all flow passes through the predetermined area of openings 20.

The fibrous mass inserted manually within chamber 11 is compressed between cover 12 and an air actuated compression plunger 25 as shown in this exemplary application which is moved forward to a predetermined displacement relative to the cover or closure member 12 to compress the mass to a predetermined volume. Plunger 25 similarly includes openings 27 of a predetermined total area. Air can pass through the plunger, into chamber 11, and to atmosphere through the openings 20 in cover 12.

Plunger 25 is actuated from a rearward position remote from cover 12 through a connecting rod 30 connected to a piston within air cylinder 32 which is of a conventional internal construction. An O-ring 34 seals the space between plunger 25 and the wall of chamber 11 to insure that all flow goes through the openings 27 of the plunger.

As seen in FIGURE 3 plunger 25 is at its rearward position prior to insertion of a mass within chamber 11 and closure of cover 12. Thus the fibre is easily inserted and the cover 12 easily closed without exerting any substantial compressive effect on the fibre because of the expanded chamber volume at this time. A gaging port 37 is provided in the wall of chamber 11. This port is supplied with air from a suitable source through a regulator 38 and tube 17 of instrument 16. With plunger 25 in its rearward position port 37 is covered and flow into the chamber through this port is prevented. Upon closure of cover 12 plunger 25 is automatically advanced, uncovering port 37, and admitting air flow through the chamber and the fibrous mass compressed therein. When cover 12 is opened the mass is ejected by the air flow which is terminated when plunger 25 reaches its rearward position.

Air is supplied to cylinder 32 for movements of plunger 25 automatically in response to movements of cover 12 to and from the outer end of chamber 11. The open and closed positions of cover 12 are signaled by limit valves 40 and 41 which have plungers 42 and 43 actuated by lever 14 in its movements. Limit valves 40 and 41 control main valve 44 which in turn controls and meters air flow from a suitable source to alternate ends of cylinder 32. Limit valves 40 and 41 as well as main valve 44 can be of any suitable construction. However as shown, the circuit includes limit valves and a main valve of the Model 400 series manufactured by Mead Specialties Company, illustrated in detail in their catalog of 1956.

As cover 12 is closed at one end of chamber 11 it actuates plunger 43 of limit valve 41. Through the operation of main valve 44 air is then admitted to the rear end of cylinder 32, moving its piston and plunger 25 connected thereto forward to compress the fibrous mass in chamber 11 between cover 12 and the plunger. The stroke of plunger 25 is limited so that a precise amount of compression is obtained with plunger 25 positioned at a predetermined displacement relative to cover 12. As previously mentioned, as plunger 25 moves forward it uncovers gaging port 37 and air flow takes place through chamber 11 at a rate as signaled by instrument 16. This rate is in turn dependent upon the fineness of the fibres being measured and the instrument can be so calibrated.

After the measurement has been completed and suitably recorded, handle 15 is manually actuated by the operator to retract cover 12. As plunger 42 of limit valve 40 is depressed when lever 14 and cover 12 reach their upward positions, main valve 44 is automatically actuated to supply air under pressure to the forward end of cylinder 32 to retract plunger 25. However, air flow is maintained through chamber 11 to eject the fibrous mass until plunger 25 reaches its rearward-most position covering gaging port 37.

Thus it is seen that an apparatus has been provided for rapid and precise measurements of fineness characteristics. The apparatus is inherently safe in operation while extremely simple in its circuitry and construction.

Because the only movable external component is cover 12 which is manually positioned by the operator, dangers through its actuation are eliminated. The only power operated component, plunger 25, is internal within chamber 11 where it is impossible for injury to the operator to result from its movements.

There are no complex electrical or other controls involved in the operation of the apparatus. Through the simple operation of commercially available limit valves 40 and 41 as well as main valve 44, the entire sequential operation is reliably carried out. The necessity for complicated controls for controlling the gaging air is avoided through the inherent operation of the apparatus as compression plunger 25 closes and uncovers gaging port 37.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an apparatus of the character described, means providing a fibre receiving chamber, a cover at one end of said chamber openable for insertion of a mass of the fibre to be gaged into said chamber, a compression piston movable axially along said chamber in sealed relation with the walls thereof, an air pressure source connected for supplying air under pressure to said chamber through an opening in the wall thereof, said cover and said plunger each having passage means of predetermined area therethrough, means limiting movement of said piston between a retracted position covering said opening to a forward position at a predetermined displacement relative to said cover for compressing the fibrous mass to a predetermined volume and uncovering said opening to admit air through said piston and the compressed fibrous mass to atmosphere through said cover, an actuator connected for movement of said piston between its extreme positions, control means operatively connected to said actuator responsive to movement of said cover to closing position for advancing said piston to its forward position and responsive to movement of said cover to opening position for retracting said piston whereby the air flow is momentarily maintained and the fibrous mass ejected from the chamber following gaging, said air source including means for measuring the air flow as determined by the character of the compressed fibrous mass.

2. An apparatus as set forth in claim 1 wherein said actuator includes pneumatic actuating means, said control means including first and second mechanically actuated valve means respectively engaged and operated upon movement of said cover to and from closing position.

References Cited in the file of this patent

UNITED STATES PATENTS

| | | |
|---|---|---|
| 2,880,609 | Byrkett et al. | Apr. 7, 1959 |
| 2,888,823 | Hertel | June 2, 1959 |
| 2,919,573 | Berkley et al. | Jan. 5, 1960 |